Nov. 1, 1955  J. N. BRUCE ET AL  2,722,397
VALVE
Filed Oct. 3, 1951  2 Sheets-Sheet 1
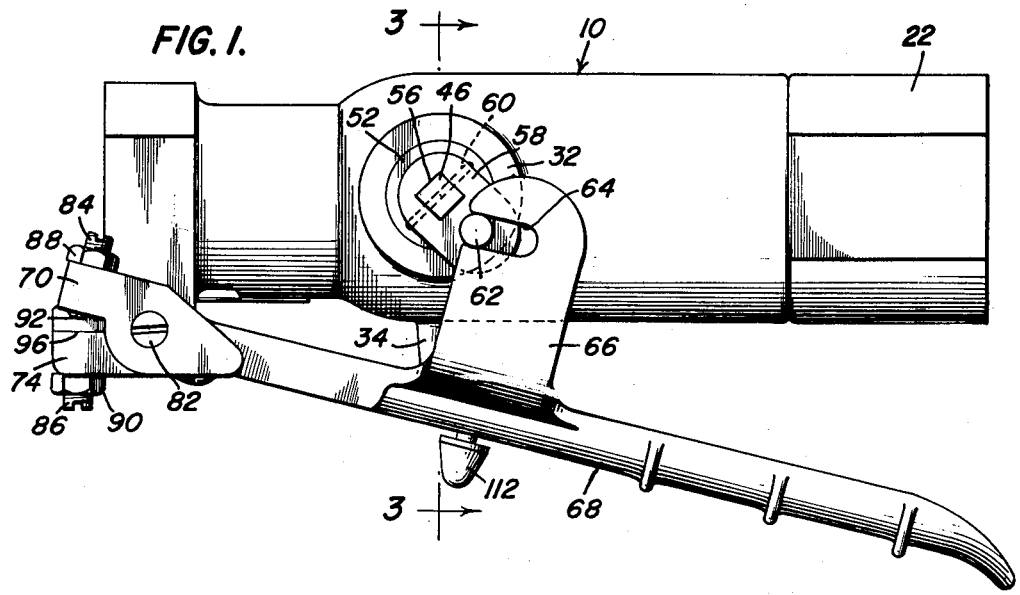
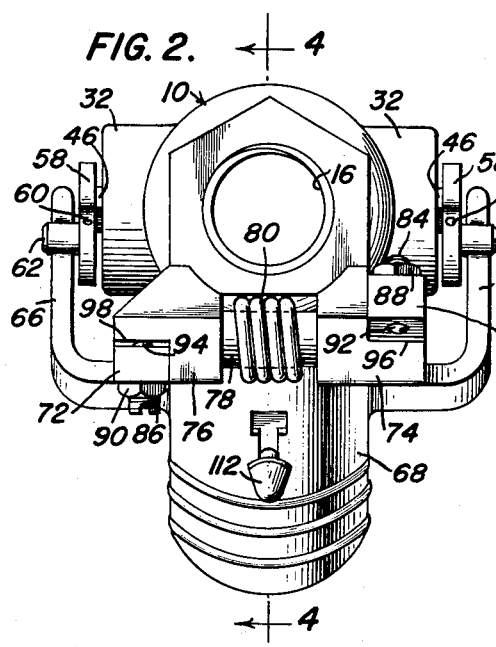
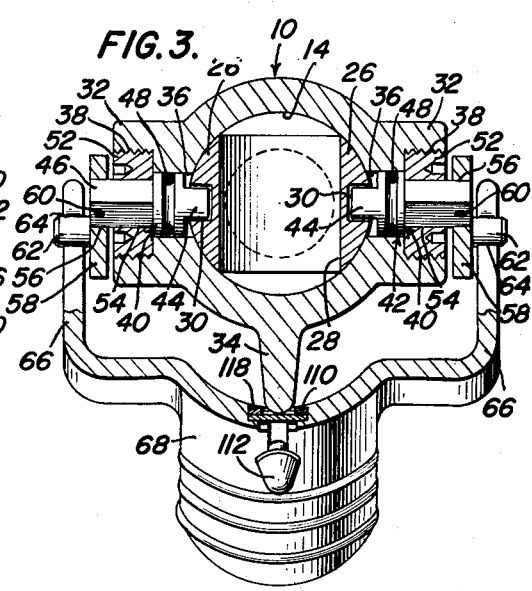
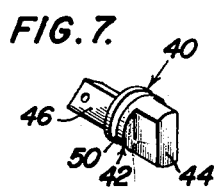
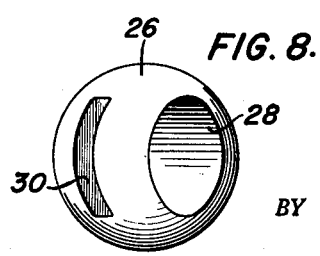
INVENTOR.
JOHN N. BRUCE
BY JERRY F. MAXA
George Renshaw
ATTORNEY Nov. 1, 1955 J. N. BRUCE ET AL 2,722,397
VALVE
Filed Oct. 3, 1951 2 Sheets-Sheet 2
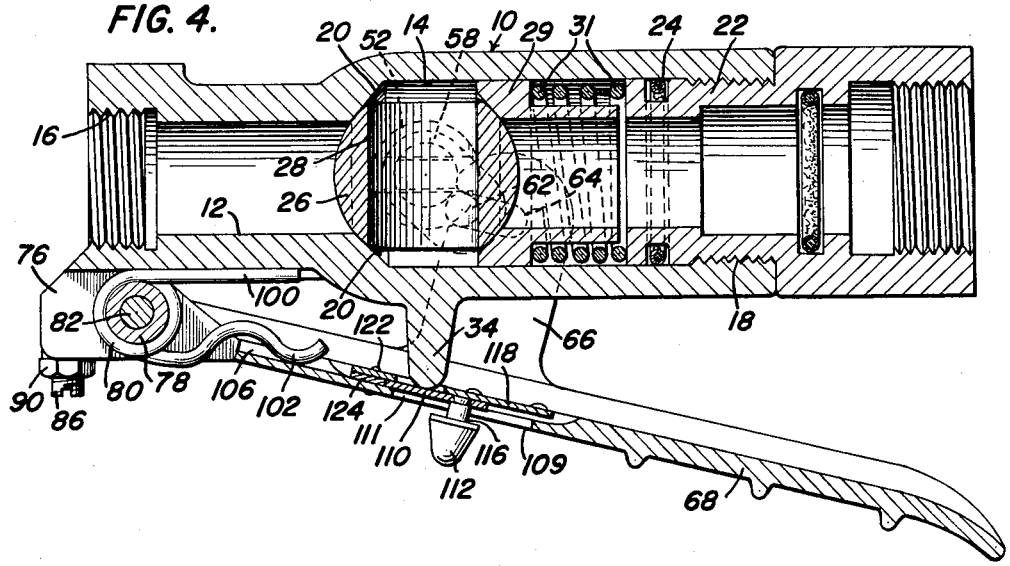
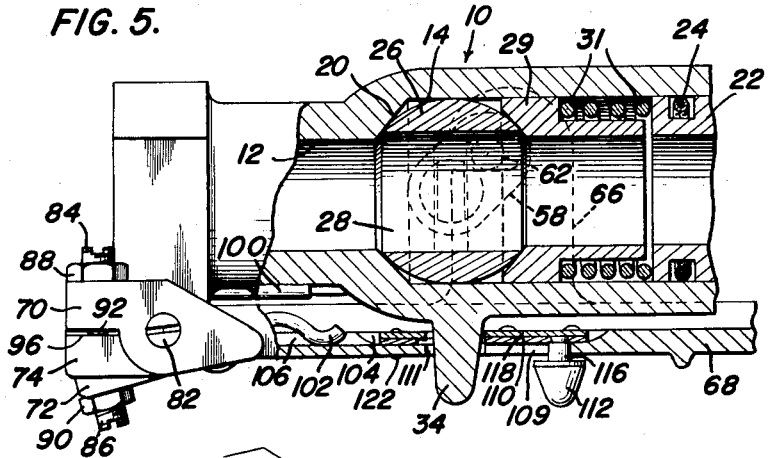
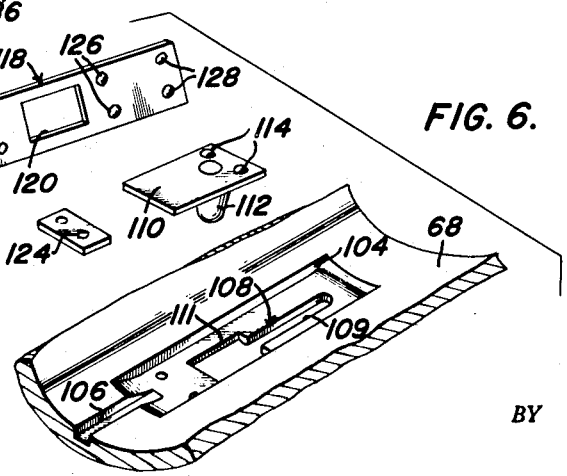
INVENTOR.
JOHN N. BRUCE
BY JERRY F. MAXA United States Patent Office 2,722,397
Patented Nov. 1, 1955

2,722,397
VALVE

John N. Bruce, Edgewood, and Jerry F. Maxa, Baltimore, Md.

Application October 3, 1951, Serial No. 249,608

4 Claims. (Cl. 251—110)

(Granted under Title 35, U. S. Code (1952), sec. 266)

The invention described herein may be manufactured and used by or for the Government, for governmental purposes, without the payment to us of any royalty thereon.

This invention relates generally to valve assemblies for controlling the flow of fluids and specifically to those for controlling the flow of liquids and semi-liquids.

It is an object of this invention to provide a fluid-flow control valve assembly of the floating ball valve type wherein the ball valve seats itself under the pressure of the fluid when it is closed.

It is a further object of this invention to provide a fluid pressure-seated floating ball valve type assembly which provides a continuous, unobstructed fluid passageway when the ball valve is open.

It is a still further object to provide a fluid pressure-seated floating ball valve type assembly which requires a minimum of effort to open and close.

It is a specific object to provide a fluid pressure-seated floating ball valve type assembly wherein the ball valve can be rotated through an angle of 90° from closed to open position by moving a specially designed actuating handle through a much smaller angle.

It is a more specific object of this invention to provide a fluid pressure-seated floating ball valve type assembly wherein the ball valve actuating means is provided with a safety catch which prevents unintentional opening of the ball valve.

It is a very specific object of this invention to provide a fluid pressure-seated floating ball valve type assembly for a military flamethrower or similar device which is provided with a specially designed actuating means and a safety catch therefor.

The foregoing and other objects and advantages will become more apparent from the specification and drawings. In the drawings, wherein like reference characters indicate corresponding parts throughout the several views: Fig. 1 is a side elevation of the valve assembly; Fig. 2 is a front elevation of the valve assembly; Fig. 3 is a sectional view taken on line 3—3 of Fig. 1; Fig. 4 is a sectional view taken on line 4—4 of Fig. 2; Fig. 5 is a partial sectional view similar to Fig. 4 showing some of the parts in a different position; Fig. 6 is a fragmentary perspective view of a portion of the actuating handle and the elements of the safety catch; Fig. 7 is a perspective view of an element of the valve actuating mechanism; Fig. 8 is a perspective view of the ball valve.

Referring to the drawings, reference numeral 10 indicates generally the casing of the valve assembly which in the specific application illustrated constitutes a removable section of a flamethrower. Casing 10 is generally shaped like a cylinder having a main passageway comprising bore 12 and counterbore 14 formed therein. The forward end of bore 12 and the rearward end of counterbore 14 are internally threaded at 16 and 18 respectively to facilitate the insertion of the casing 10 into a fluid line. Bore 12 extends into the casing to a point where it abruptly enlarges into counterbore 14. The abrupt enlargement is in the form of inclined annular wall 20 which joins the bores 12 and 14 and constitutes a valve seat. Cylindrical sleeve adapter 22 is secured in threaded end 18 of the casing and the joint therebetween sealed by O-ring 24. Positioned within the passageway and slidably engaging valve seat 20 is rotatable ball valve 26 which has a through hole 28 formed therein and slots 30 formed therein diametrically to each other in a plane that is transverse to the hole 28 (see Fig. 8). Ball valve 26 is constantly urged against valve seat 20 by cylindrical sleeve follower 29 which is pressed against the ball valve by compression spring 31 which is positioned between the sleeve follower 29 and sleeve adapter 22.

Casing 10 has enlarged bosses 32 formed on its sides and depending stop lug 34 formed on its bottom (see Fig. 3). Each boss 32 has a bore 36 and a coaxial threaded counterbore 38 formed therein. A ball pivoting shaft 40 having cylindrical central portion 42, rectangular end 44 and square end 46 is positioned in each bore 36 (see Fig. 3 and 7). Rectangular ends 44 of the ball pivoting shafts 40 extend into the main passageway and are loosely received in slots 30 of ball valve 26. Through this coupling, the ball pivoting shafts 40 are adapted to pivot the ball valve 26 when they are rotated. As can be clearly seen in Fig. 3, one ball pivoting shaft 40 extends into the passageway from each side and operatively engages ball valve 26. In order to seal off the main passageway from the atmosphere, O-shaped packing rings 48 are mounted in grooves 50 formed in the central portions 42 of the ball pivoting shafts 40. Apertured nuts 52 are mounted in threaded openings 38 and abut central portions 42 thereby maintaining the ball pivoting shafts in position.

Square ends 46 pass through circular apertures 54 of the nuts 52 and are freely rotatable therein. Square ends 46 extend laterally out of nuts 52 and are secured in square openings 56 of cranks 58 by pins 60. Crank pins 62 are fixed to cranks 58 and are slidably received in slots 64 of cam ears 66 which are integral extensions of the operating handle 68.

Operating handle 68 has apertured hinge ears 70 and 72 formed at its forward end. Hinge ear 70 extends upwardly at an angle from the handle 68 (see Fig. 1) and hinge ear 72 extends downwardly at an angle from handle 68 (see Fig. 2). The forward end of casing 10 has apertured hinge bosses 74 and 76 formed thereon which are adapted to cooperate with hinge ears 70 and 72 (see Fig. 2). Cylindrical spacer 78 is positioned between the hinge bosses 74 and 76 and supports torsion spring 80. Hinge pin 82 passes through the apertures in hinge ear 70, hinge boss 74, spacer 78, hinge boss 76 and hinge ear 72. Hinge pin 82 is threaded at its ends and cooperates with the apertures in hinge ears 70 and 72, which are threaded, to maintain the parts in assembled relation. Threaded stop members 84 and 86 are secured in vertically disposed threaded openings in hinge ears 70 and 72 respectively and have lock nuts 88 and 90 respectively mounted on their ends. The heads 92 and 94 of the stop members 84 and 86 respectively constitute adjustable limits which cooperate with stop surfaces 96 and 98 of hinge bosses 74 and 76 respectively to control the amount of pivotal movement of the handle 68.

Torsion spring 80 is mounted on spacer 78 and has its ends 100 and 102 extending rearwardly between and abutting the undersurface of the casing 10 and the upper surface of handle 68 respectively. Handle 68 has groove 106 formed therein for retaining spring end 102 (see Fig. 4). The spring 80 constantly urges the handle 68 away from the lower side of casing 10 to a normal position wherein stop head 94 contacts stop surface 98 thereby preventing further movement of the handle 68. By reference to Fig. 2, it will be noted that in this normal position, stop head 92 is spaced from stop surface 96. When handle 68 is squeezed toward the lower surface of casing 10 by the operator, handle 68 pivots about hinge pin 82 against the pressure of torsion spring 80, and hinge ear 72 with its associated stop member 86 moves downwardly away from stop surface 98 of hinge boss 76 and hinge ear 70 with its associated stop member 84 moves downwardly toward hinge boss 74 until stop head 92 contacts stop surface 96. From this description of the handle hinge structure, it will be observed that handle 68 is normally urged to a position wherein it diverges away from the casing 10 (see Figs. 1 and 4) but can be manually moved against the pressure of spring 80 to a position wherein it is disposed nearly parallel to the casing 10 (see Fig. 5). The hinge structure limits the pivotal movement of the handle to an angle of approximately 12 degrees.

By referring to the description of the ball valve actuating structure and to Fig. 4, it will be noted that when handle 68 is in its extended position, the ball valve 26 is positioned with its opening 28 out of alignment with the main passageway of casing 10 and therefore the valve is closed. When the handle 68 is manually moved toward the casing to the position illustrated in Fig. 5, the ball valve 26 is rotated approximately 90 degrees by the action of cam ears 66, crank pins 62, cranks 58 and the ball pivoting shafts 40 to a position wherein opening 28 is in alignment with the main passageway of casing 10 and therefore the valve is open. The meritorious feature of being able to rotate the ball valve approximately 90° by moving the handle only approximately 12° is accomplished by my novel mechanical linkage between the handle 68 and ball valve 26 and constitutes one of the cardinal improvements in my device over the prior art.

Another major feature of my device is a safety mechanism which prevents the handle from being accidently moved with the resultant unintended opening of the ball valve. In some of the uses of my device, such as when it is incorporated into a flamethrower, this feature is of utmost importance.

By referring to Figs. 4, 5, and 6, it will be seen that handle 68 has a rectangular recess 104 formed in its upper surface which joins spring end retaining groove 106 at one end. T-shaped slot 108 comprising narrow part 109 and wide part 111 is formed in the handle at a point within the borders of recess 104. Rectangular slide catch 110 has knob 112 connected to its lower side by knob shank 116, and two nipples 114 formed on its upper side. Slide catch 110 slides in recess 104 with its knob 112 extending through slot 108 with knob shank 116 positioned in the narrow part 109 of T-shaped slot 108. When the slide catch 110 is in its forward position (shown in Fig. 4) the wide part 111 of T-shaped slot 108 is covered by said slide catch, whereas when it is in its rearward position (shown in Fig. 5) the wide part 111 of T-shaped slot 108 is uncovered. The slide catch 110 is retained in position by retaining member 118 which has rectangular opening 120 formed therein and which is secured to handle 68 at its forward end by rivets 122. Rivets 122 pass through retaining member 118, spacer 124 and handle 68. Retaining member 118 is flexible and acts like a leaf spring in that its rear portion can be flexed upwardly away from the slide catch 110. Two sets of recesses 126 and 128 are formed in the lower face of retaining member 118 (see Fig. 6 wherein the bottom of retaining member 118 is shown). Nipples 114 of the slide catch are adapted to enter either set of recesses 126 or 128 depending upon the position of the slide catch. In its forward position, nipples 114 are seated in recesses 126 whereas in its rearward position nipples 114 are seated in recesses 128. With this arrangement, the slide catch can be moved to its forward position shown in Fig. 4 when the device is not in use and the valve cannot be opened for the slide catch 110 prevents stop lug 34 from passing through slot 108 in the handle. When it is desired to use the device, it is necessary to move the slide catch to its rearward position shown in Fig. 5 wherein wide part 111 of slot 108 is uncovered thereby allowing stop lug 34 to pass through the handle. When the slide catch is adjusted from one position to the other, retaining member 118 flexes to allow the nipples 114 to move out from one set of recesses and into the other.

In operation, the device functions as follows: at the outset the valve is closed and the parts are positioned as illustrated in Fig. 4; in order to open the valve the slide catch 110 is retracted to its rearward position and the operating handle 68 is squeezed toward the casing 10 to the position illustrated in Fig. 5. As the handle 68 is moved toward the casing against the pressure of torsion spring 80, the ball valve 26 is rotated from its closed to open position by the mechanical linkage between the handle and ball valve. In its open position the main passageway is fully open and substantially continuous and unobstructed. To close the valve, handle 68 is released and torsion spring 80 expands and urges the handle away from the casing to the position shown in Fig. 4. During this movement, the ball valve is rotated to its closed position by the mechanical linkage. It should be noted that in its closed position the ball valve is firmly seated against the valve seat by the pressure of the fluid.

From the above description, it will be observed that a valve assembly has been provided which fulfills each of the objects of this invention. Specifically, a quick acting, easily manipulated, actuating means having a safety mechanism has been provided for a fluid pressure-seated ball valve which is of general utility but of particular merit when employed in a flamethrower or similar device.

We claim:

1. In a valve assembly, the combination comprising a casing having a passageway formed therethrough, a valve seat formed in said passageway, an apertured ball valve positioned adjacent to said valve seat and adapted to move from a position wherein the aperture in said ball valve is out of alignment with said passageway to a position wherein said aperture is in alignment with said passageway, means for controlling the movement of said valve comprising two diametrically opposed slots formed in said valve, an opening in each side of said casing adjacent to said valve seat, a ball pivoting shaft positioned in each of said openings and having one end extending into said passageway and into one of said slots and its other end extending out of said casing, a crank having an offset crank pin fixed thereto secured to each end which extends out of said casing, a handle pivotably mounted to said casing having two cam ears formed thereon, and a cam slot formed in each cam ear adapted to slidably receive one of said offset crank pins.

2. A valve assembly as defined in claim 1 which includes resilient means for urging said handle away from said casing.

3. A valve assembly as defined in claim 2 which includes means for limiting the extent of movement of said handle away from said casing.

4. A valve assembly as defined in claim 1 which includes means for selectively preventing said handle from being moved toward said casing.

References Cited in the file of this patent

UNITED STATES PATENTS

| | | |
|---|---|---|
| 144,735 | Brooks | Nov. 18, 1873 |
| 849,121 | Frorer | Apr. 2, 1907 |
| 2,171,292 | Pieper | Aug. 29, 1939 |
| 2,347,755 | Spreng | May 2, 1944 |
| 2,558,260 | Maky | June 26, 1951 |
| 2,577,255 | Logan | Dec. 4, 1951 |